(12) United States Patent
Bitner et al.

(10) Patent No.: US 6,581,133 B1
(45) Date of Patent: Jun. 17, 2003

(54) RECLAIMING MEMORY FROM DELETED APPLICATIONS

(75) Inventors: Deloy Pehrson Bitner, Glendale, AZ (US); Kim Clohessy, Scottsdale, AZ (US); Mikael Orn, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/418,332

(22) Filed: Oct. 14, 1999

(30) Foreign Application Priority Data

Mar. 30, 1999 (CA) .............................. 2267484

(51) Int. Cl.[7] .............................................. G06F 12/00
(52) U.S. Cl. .......................... 711/103; 711/170; 711/5; 707/206; 365/185.11; 365/189.09
(58) Field of Search .......................... 711/103, 5, 170; 707/206; 714/701; 365/185.11, 189.09

(56) References Cited

U.S. PATENT DOCUMENTS

| | | | |
|---|---|---|---|
| 4,511,964 A | | 4/1985 | Georg et al. ................ 711/202 |
| 5,438,573 A | * | 8/1995 | Mangan et al. ............. 714/701 |
| 5,544,356 A | * | 8/1996 | Robinson et al. ...... 365/185.11 |
| 5,592,669 A | * | 1/1997 | Robinson et al. ........... 707/206 |
| 5,603,001 A | * | 2/1997 | Sukegawa et al. .......... 711/103 |
| 5,737,742 A | * | 4/1998 | Achiwa et al. ........ 365/189.09 |
| 5,860,082 A | * | 1/1999 | Smith et al. ................ 711/103 |
| 6,038,636 A | * | 3/2000 | Brown et al. ............... 711/103 |

FOREIGN PATENT DOCUMENTS

| | | |
|---|---|---|
| EP | 0745939 A2 | 5/1996 |
| EP | 745939 A2 | 12/1996 |
| WO | WO 9420906 | 2/1994 |
| WO | WO 9420906 | 9/1994 |
| WO | WO 0058838 | 3/2000 |

* cited by examiner

Primary Examiner—Do Hyun Yoo
Assistant Examiner—Brian R. Peugh
(74) Attorney, Agent, or Firm—F. Chau & Associates, LLP

(57) ABSTRACT

The invention provides a method for removing code (applications and data) from read-only memory, and compacting the remaining code in memory either as an application is deleted or when there is not sufficient room to hold a new application. One or more "spare" memory segments are reserved for use during compaction. Where the code for removal shares a memory segment with other code that is not to be removed, the other code is copied to a spare memory segment, and then swapped back to its original location. The code can then be compacted to remove the "holes" left by the erased code.

9 Claims, 6 Drawing Sheets

RECLAIMING MEMORY FROM DELETED APPLICATIONS

FIELD OF THE INVENTION

The present invention is directed to the area of memory management in computer systems with segmented memory space, such as embedded devices, and specifically provides a system for safely reclaiming memory and realigning the remaining applications contiguously in non-volatile, erasable "flash"-type memory.

BACKGROUND OF THE INVENTION

This application is particularly useful in embedded systems with memory constraints, but is applicable in any environment in which applications may be removed from a machine and it is desirable to compact the remaining applications stored in memory, in order to provide the maximum amount of contiguous free space for new applications.

In embedded systems, total system memory may be in the order of 1 to 4 megabytes. Ideally, half of the system memory should be devoted to read-only memory (ROM), for storing applications and data which persist between sessions. Applications can be loaded, in sequential order, until the memory limits of the system are reached.

For the purposes of this invention, reference will be made to "flash" type memory. Technically, flash is a form of ROM in that it is non-volatile, but it is also erasable, generally in 64K byte blocks, according to current technology.

Particularly in the rapidly developing area of wireless communications, it may be necessary or desirable to delete existing applications in a device before a new application can be downloaded, either to free adequate memory to accommodate the new application(s) or to avoid incompatibility with newer versions of an application.

SUMMARY OF THE INVENTION

The present invention is directed to a system for safely removing applications from ROM, and then compacting the ROM to remove any "holes" left by application removal. This ensures that the maximum amount of contiguous free memory is made available for new application download.

In one embodiment, the present invention is directed to an improvement in a device's non-volatile memory. This flash memory is characterized by having multiple memory segments adapted to receive and store application code and data. The improvement consists of having at least one memory segment reserved for use during memory compaction, which is adapted to receive code and/or data copied from another memory segment of the read-only memory. A mechanism for correcting pointers within the code to reference the new memory location of the code and/or data copied from another memory segment of the read-only memory is also provided.

According to another aspect, the present invention provides a method for removing a defined body of code from a read-only memory with multiple memory segments and at least one memory segment reserved for use during compaction. In the method, if it is determined that the defined body of code overlaps into a memory segment shared with other code, the other code is copied into a memory segment reserved for use during compaction, the memory segment reserved for compaction is swapped with the memory segment shared with other code, and the memory segment containing a portion of the defined body of code is erased.

DETAILED DESCRIPTION OF THE PREFERRED EMBODIMENTS

As schematically illustrated in FIG. 1 (consisting of FIGS. 1A through 1D), a ROM 2 in a constrained memory device, such as a cellular telephone, could typically comprise 32 64K memory segment blocks, generally designated by 4, to total 2 megabytes of flash memory in the device.

In the implementation of the invention for the preferred embodiment, the applications in the ROM are allocated from low memory to high memory.

Figure 1A:
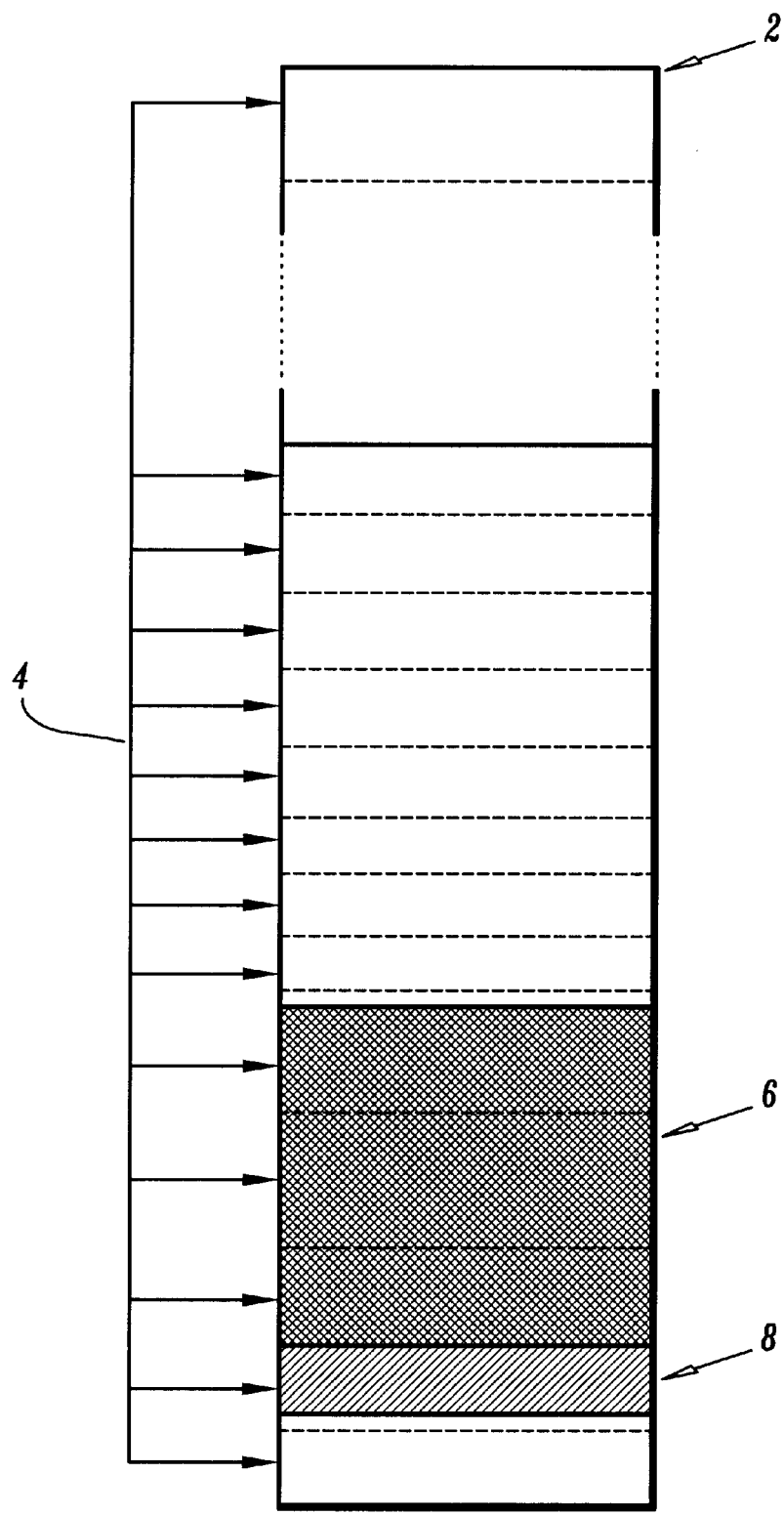
FIG. 1, which comprises FIGS. 1A through 1D, schematically illustrates code removal and compaction in the read-only-memory (ROM) of a constrained memory device, according to the invention.
Figure 1B:
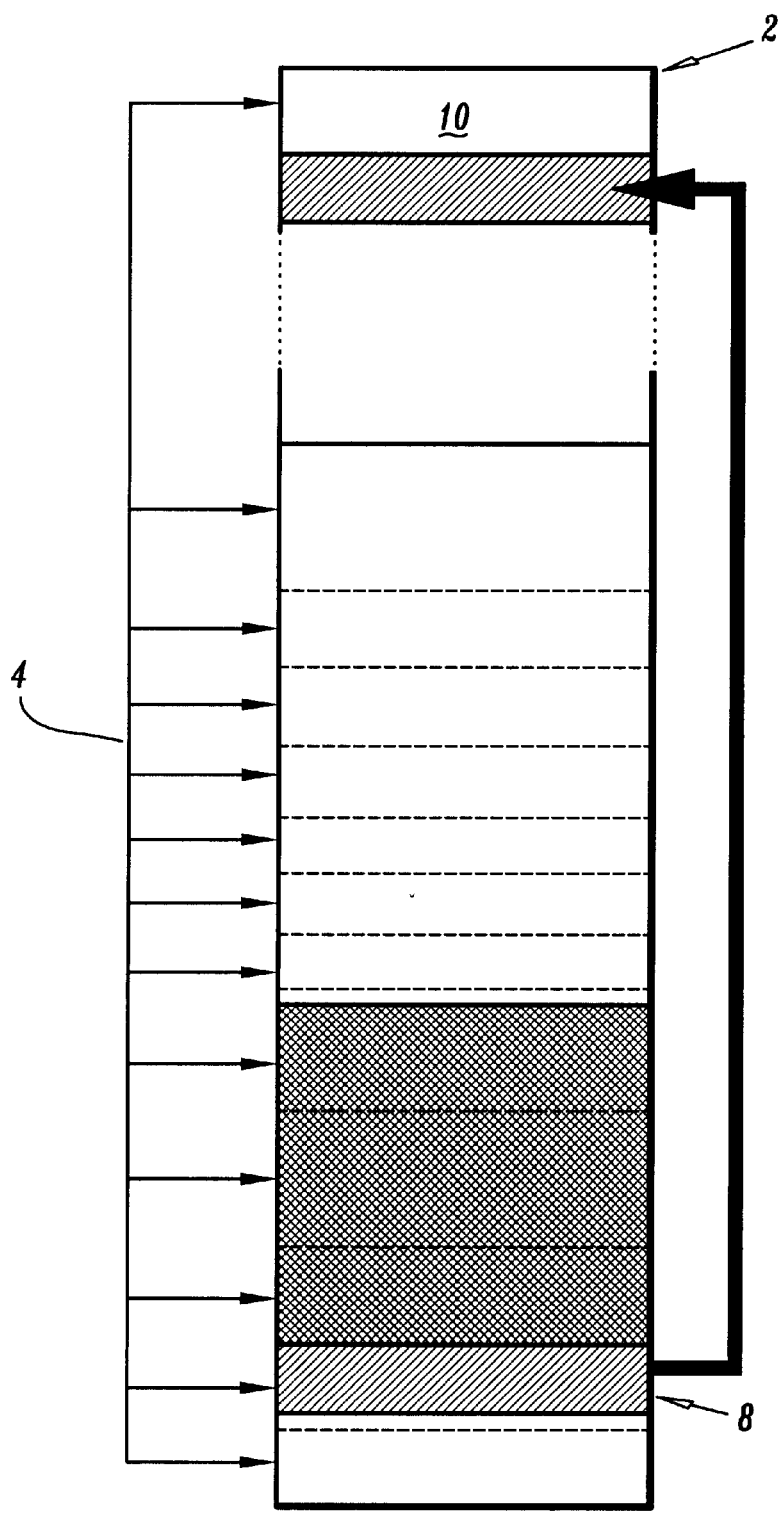
Figure 1C:
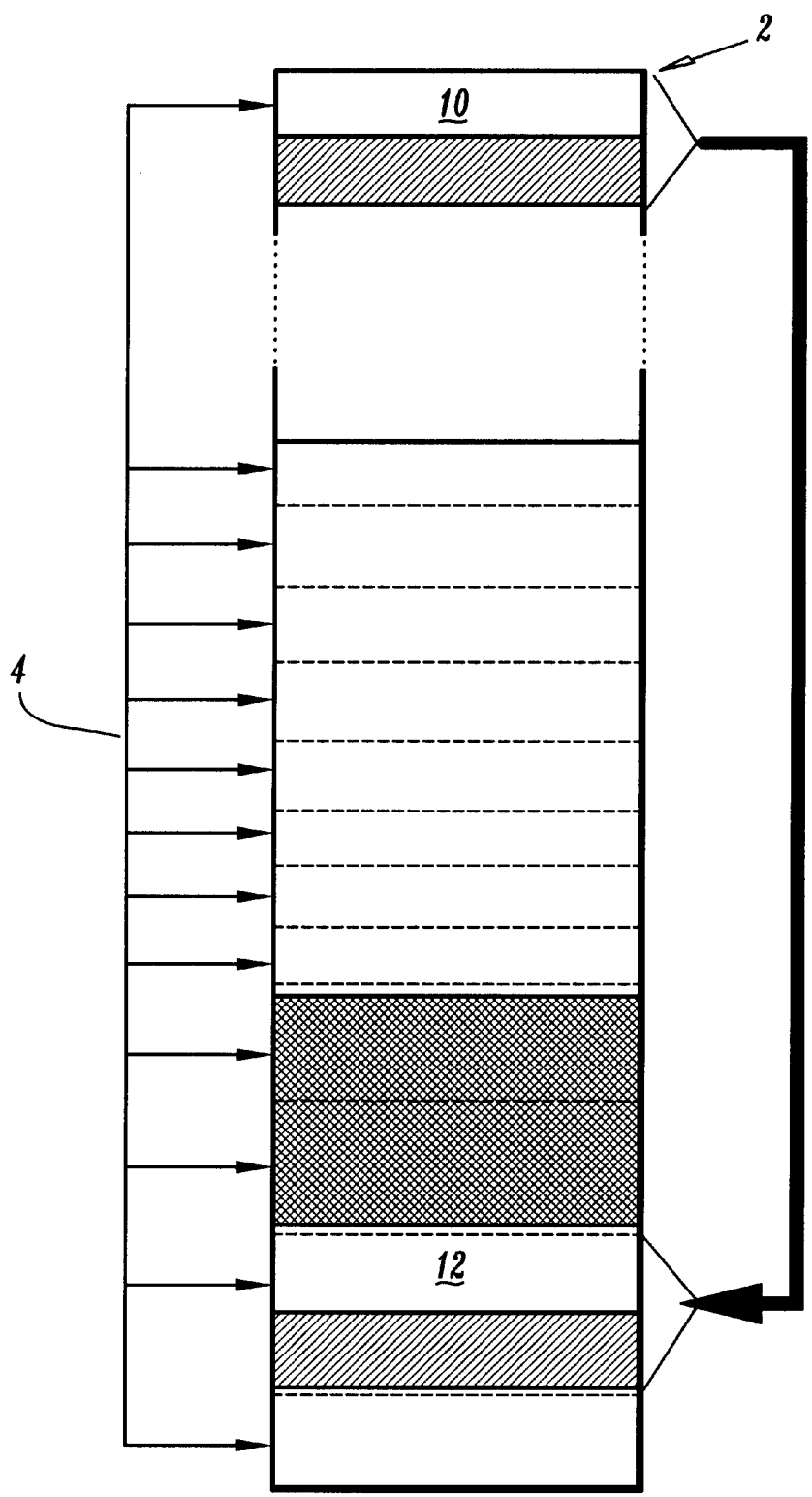

As shown in FIGS. 1A and 1B, an application 6, shown in cross-hatch shading, spans two and a half memory segment blocks 4 in ROM 2. Code or data 8, shown in diagonal striping, from a contiguously stored application shares one memory segment with the first part of the application 6.

Only entire blocks of memory can be erased in the flash memory used in these devices, as discussed above. Therefore, if the user wants to erase the application at 6, the device's memory manager will have to save the code or data 8 from the contiguously stored application and then restore it to this location.

Figure 1D:
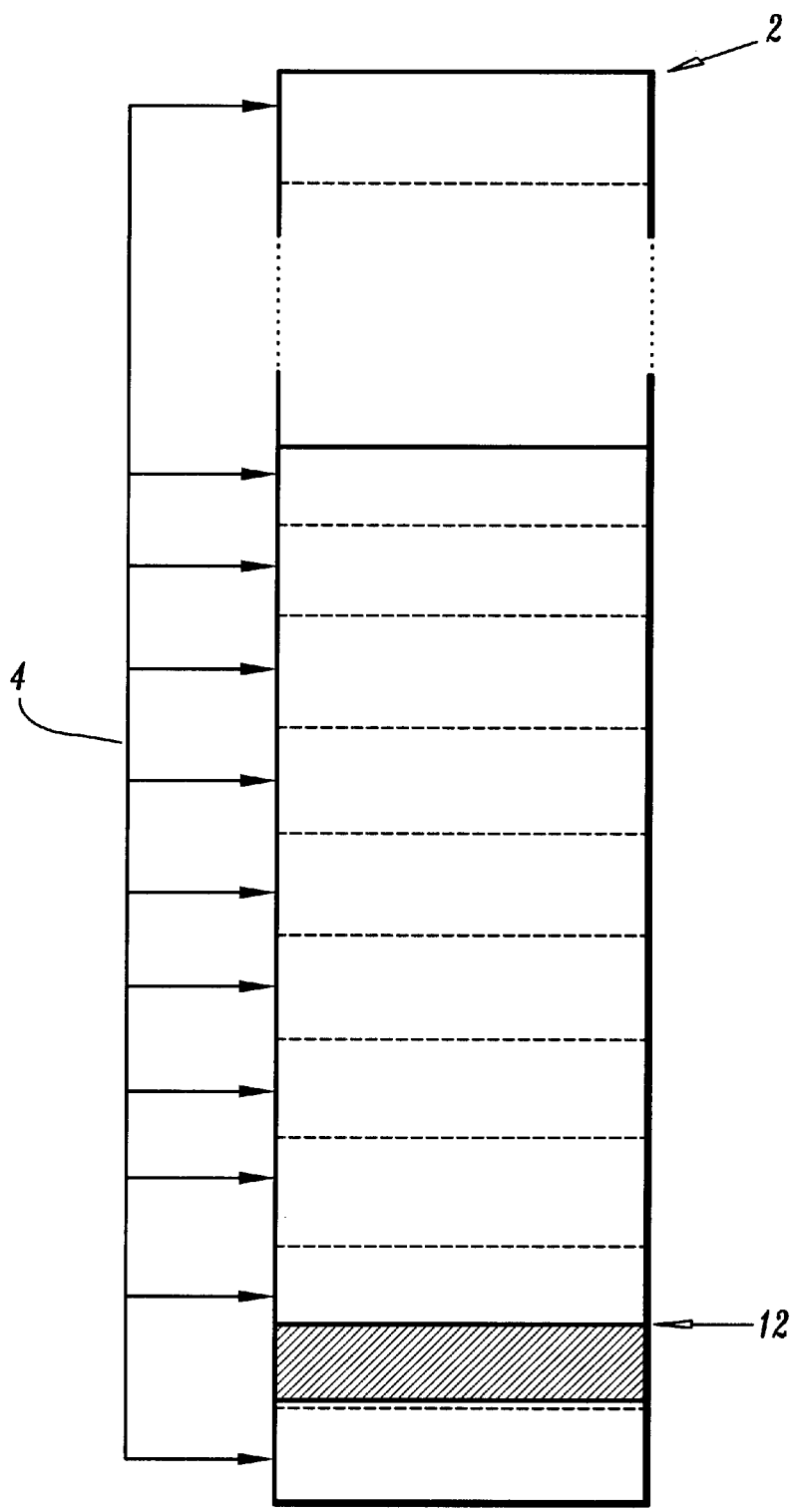

This is accomplished by retaining one or more spare memory blocks to use for swapping out blocks of stored code or data to retain in the device. In the preferred embodiment, the manager of the "flash" memory simply reserves the highest block(s) for the compaction process. In the example shown in FIG. 1, the memory manager copies the code or data 8 up into a spare block 10 (FIG. 1B). Only the code/data from the block being deleted is copied; the top of the spare block is left empty. The spare block containing the copied code 10 is then "swapped" with the original memory block at 12 (FIG. 1C), and the memory blocks containing the remaining code/data of the application 6 can then be safely erased (FIG. 1D). This swapping may be done in one of two ways: if a memory management unit (MMU) supporting "virtual" memory regions is available, the MMU mapping is changed so that the "new" block is using the address previously used by the block being deleted. The block being deleted is erased and its memory mapping is changed to the address being used previously by the spare block. If a MMU is not available, the contents of the "spare" block is copied on top of the original block, after it has been erased.

Figure 2:
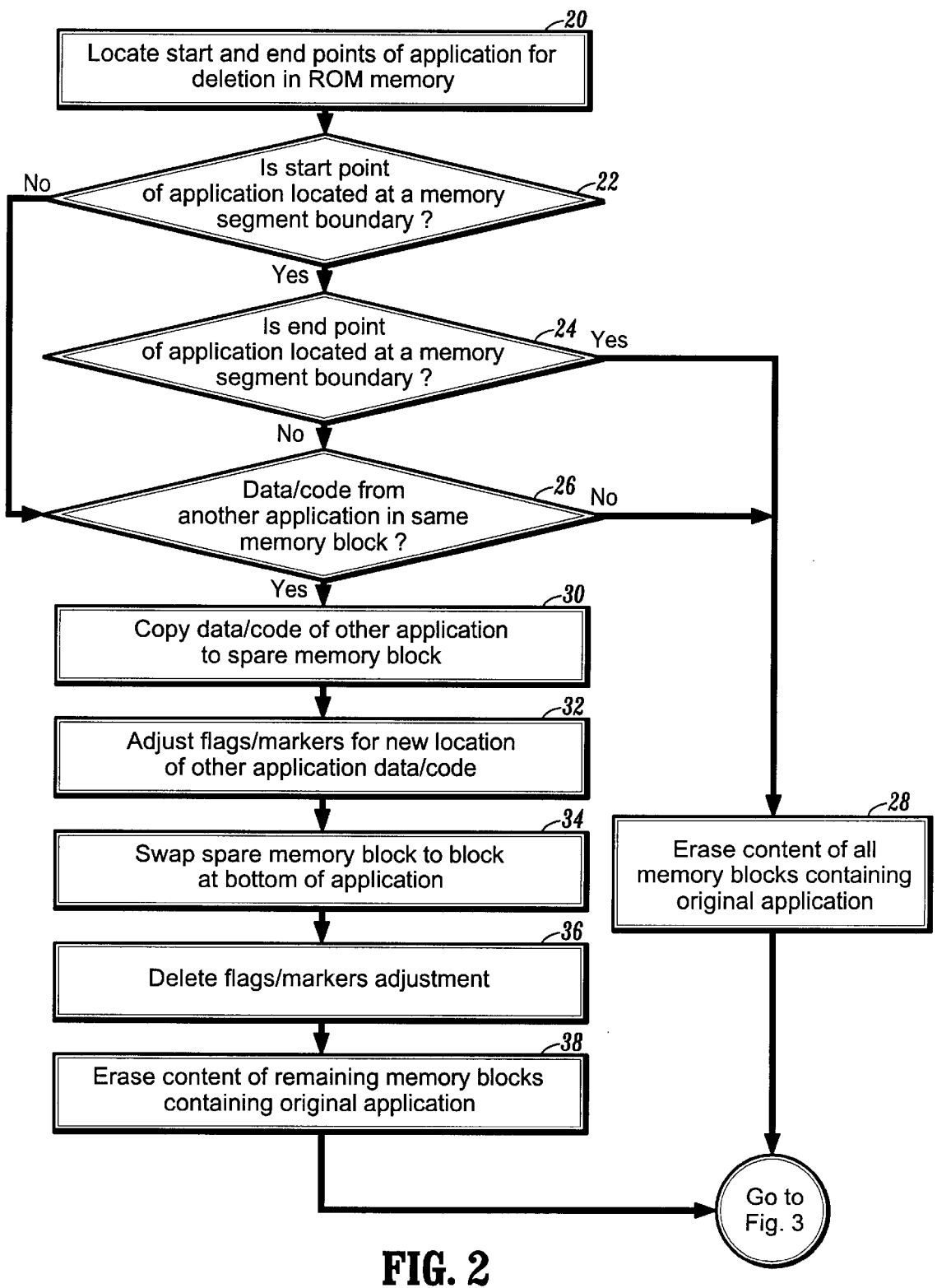
FIG. 2 is a flow diagram illustrating the steps for code removal, according to the invention.
Figure 3:
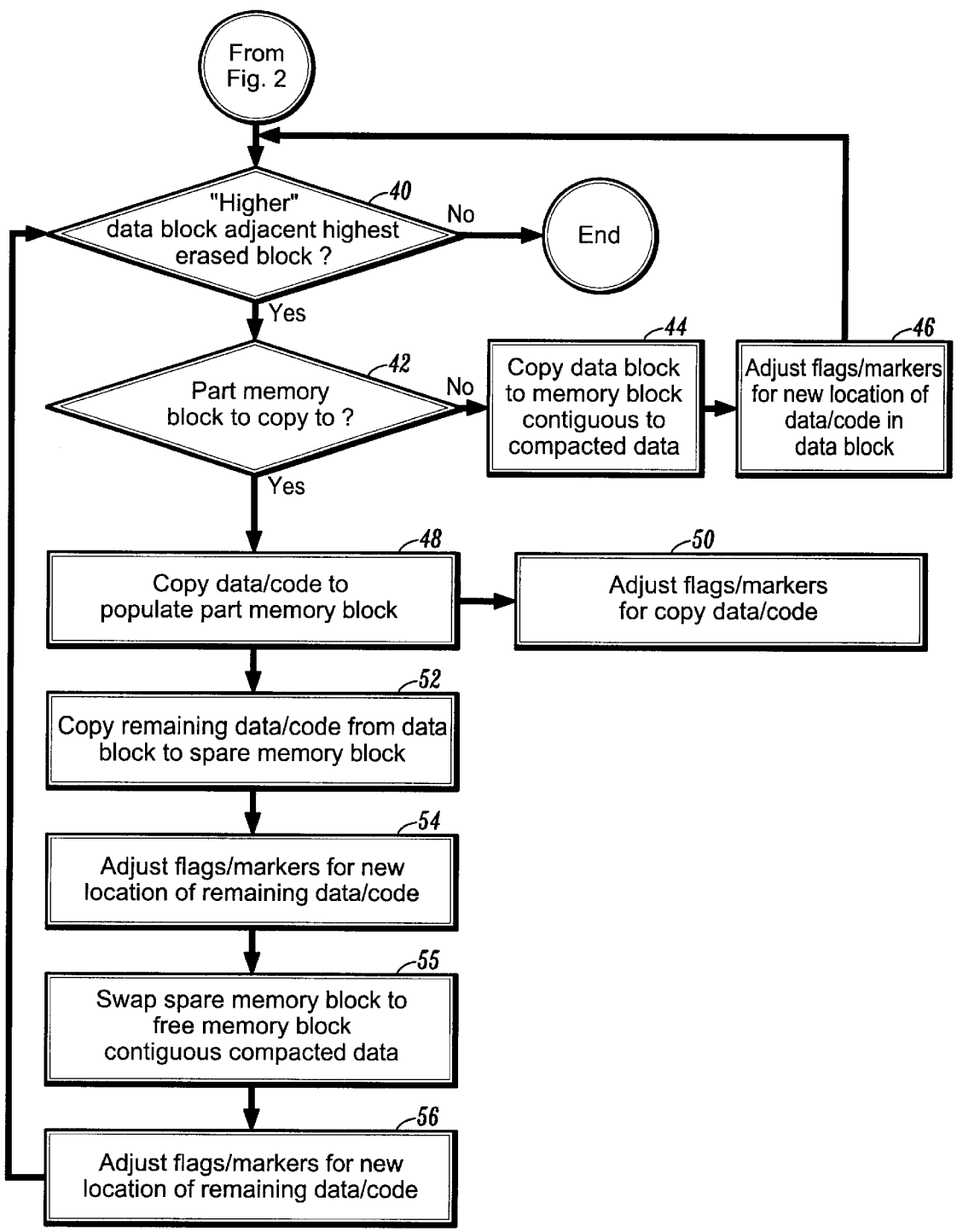
FIG. 3 is a flow diagram illustrating the steps for memory compaction following code removal, according to a preferred embodiment of the invention.

The steps for this process are set out in the flow diagram of FIG. 2. When the user desires to delete an application from memory, the device's memory manager locates the start and end points in ROM of the application (block 20) to determine whether both are located on a memory segment boundary (blocks 22, 24). If this is the case, it is safe for the memory manager to simply erase all memory segment blocks containing the application (block 28) and proceed to compaction which is shown in FIG. 3.

Continuing with FIG. 2, if the memory manager determines that an end point of the application is inside a memory segment block (block 22 or 24), it next determines whether the application is sharing a memory segment block at this point with other code (block 26). The "flash manager" keeps track of start and end addresses of each application and also knows the addresses of each memory block, so it is a simple calculation to determine where the application/data resides relative to the start/end of the memory blocks and other applications.

If no other application code/data is located, it is safe to delete the original application (block 28) and proceed to compacting the ROM.

If the memory manager determines that data or code from another application is stored in the same block with a portion of the original application for deletion (block 26), this code or data is copied into a spare memory segment block (block 28) without any of the original application code (i.e., the spare memory segment block is partially blank).

The copy to the spare memory segment block is made in such a way that the device can recover if the device is powered off in the midst of a memory deletion/compaction operation. In the preferred embodiment, flags and markers are used to indicate the state of the application during the loading, deleting and compacting functions (block 30).

The code/data from the other application in the spare memory segment block is then swapped back to the bottom of the original application to be deleted (block 34). The flags and markers added to indicate that a transfer is underway are reset (block 36) and the memory segment blocks containing the remainder of the original application are erased (block 38).

Once the application has been removed, its memory must be reclaimed by compacting or "sliding" the applications above it down into the empty space. This leaves the maximum amount of contiguous free space at the top of the ROM for loading new applications.

According to a preferred embodiment of the invention, compaction follows the same principles as for deleting an application, that is, spare memory segment blocks are used for transferring the content of partially filled memory segment blocks, and this process is illustrated in FIG. 3.

Once the application has been unloaded, the memory should be compacted in order to remove any "holes". This provides the maximum contiguous free memory for downloading new applications. A preferred method for performing compaction, utilizing the principles of the present invention, is illustrated in FIG. 3.

Following the application unload, the memory manager scans the memory to determine if there are any memory blocks populated with data or code above the memory blocks freed by unloading the application—that is, if unloading the application has left an empty "hole" in the recorded memory (block 40). If not, then the unloaded application was at the top of the recorded memory, and compaction is not required.

If there is recorded data/code above the freed memory, the memory manager determines whether a part or whole empty memory block is at the bottom of the freed memory (block 42).

If the freed memory is in whole memory blocks, compaction is performed simply, by copy the data blocks down the memory sequentially to the next empty memory block (block 44), and adjusting the flags/markers for the new location of each block of data or code (block 46).

Where there is only a part memory available, the memory manager copies data/code from the data block to fill the part memory block (block 48) and adjusts the flags/markers for the copied code (block 50).

In the same manner as discussed above in relation to FIG. 2, the remaining data/code from the data block is copied to a spare memory block (block 52) and the flags/markers adjusted for the location of this code/data (block 54). This spare memory block is swapped to the free memory contiguous to the already compacted data (block 55), and the flags/markers of the data/code in the swapped block adjusted (block 56).

This process is performed recursively until all data has been compacted (block 40).

Although the invention has been described in association with preferred embodiments, it will be understood that it is applicable to other platforms and memory arrangements by employing modifications obvious to the person skilled in the art.

The embodiments of the invention in which a new property or privilege is claimed are defined as follows:

1. In a computing environment, a non-volatile memory having multiple memory blocks for receiving and storing application code and data, wherein the improvement comprises:

at least one memory block being reserved for use during memory compaction and for receiving only code and/or data copied from another memory block of the non-volatile memory;

a mechanism for correcting pointers/markers to reference a new memory location of the code and/or data copied from another memory block of the non-volatile memory; and a mechanism for swapping the at least one memory block reserved for use during compaction with said another memory block of the non-volatile memory.

2. A computing environment, according to claim 1, wherein the multiple memory blocks receive data for storage from a low end to a high end and wherein said at least one memory block is reserved at the high end.

3. A method for removing a defined body of code from a non-volatile memory having multiple memory blocks, at least one memory block being reserved for use during compaction, comprising:

scanning the defined body of code for overlap into a memory block shared with other code;

copying the other code into the at least one memory block reserved for use during compaction;

swapping the at least one memory block reserved for use during compaction with the memory block shared with other code;

erasing any memory block containing a portion of the defined body of code.

4. A method, according to claim 3 wherein the step of swapping the at least one memory block reserved for compaction with the memory block shared with other code, in a system having virtual memory regions and the memory block shared with other code is at a first address, comprising mapping the memory block reserved for compaction to the first address.

5. A computer-readable memory for storing the instructions for use in the execution in a computer of the method of claim 4.

6. A method according to claim 3, wherein the step of swapping the at least one memory block reserved for compaction with the memory shared with other code comprises:

erasing the memory block shared with other code; and copying the memory block reserved for compaction onto the erased memory block.

7. A computer-readable memory for storing the instructions for use in the execution in a computer of the method of claim 6.

8. A computer-readable memory for storing the instructions for use in the execution in a computer of the method of claim 3.

9. A computer program product comprising a computer usable medium having computer readable program code means embodied therein for causing a computer to remove a defined body of code from non-volatile memory having multiple memory blocks of which at least one memory block is reserved for use during compaction, the computer readable program code means in said computer program product comprising:

computer readable program code means for causing the computer to scan the defined body of code for overlap into a memory block shared with other code;

computer readable program code means for causing the computer to copy the other code into the at least one memory block reserved for use during compaction;

computer readable program code means for causing the computer to swap the at least one memory block reserved for use during compaction with the memory block shared with other code; and computer readable program code means for causing the computer to erase any memory block containing a portion of the defined body of code.

\* \* \* \* \*